No. 794,939. Patented July 18, 1905.

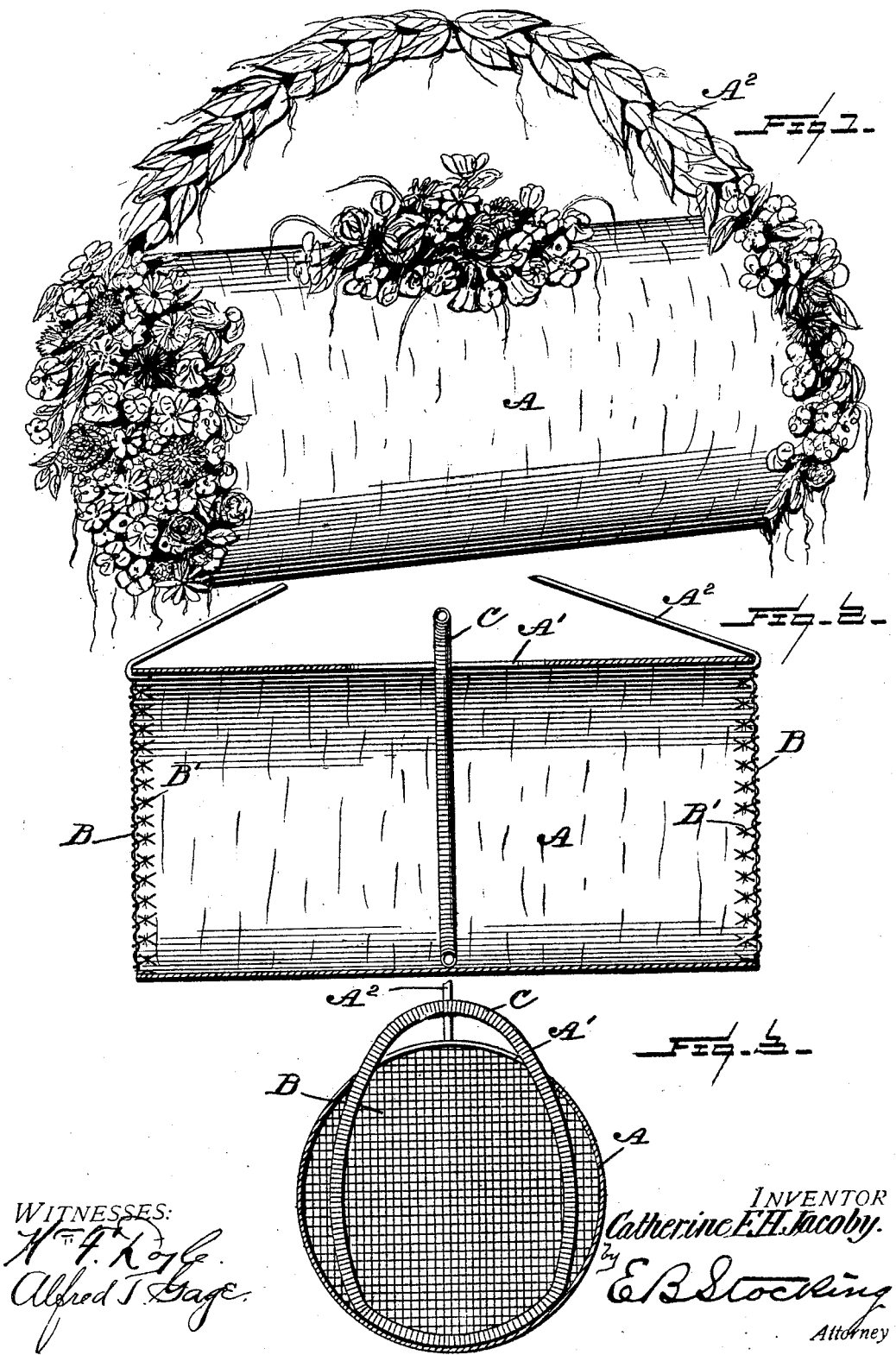

UNITED STATES PATENT OFFICE.

CATHERINE E. H. JACOBY, OF EASTON, PENNSYLVANIA.

FLOWER-HOLDER.

SPECIFICATION forming part of Letters Patent No. 794,939, dated July 18, 1905.

Application filed May 18, 1905. Serial No. 261,027.

*To all whom it may concern:*

Be it known that I, CATHERINE E. H. JACOBY, a citizen of the United States, residing at Easton, in the county of Northampton, State of Pennsylvania, have invented certain new and useful Improvements in Flower-Holders, of which the following is a specification, reference being had therein to the accompanying drawings.

This invention relates to flower-holders, and particularly to a device for supporting cut flowers in an attractive form, such as a floral design representing a pillow.

The invention has for an object to provide a body portion having at its opposite ends reticulated faces through which the stems of the flowers to be supported are inserted and are thus held in position to form a floral surface at each end of the body.

A further object of the invention is to provide a holding-ring within the body by which other cut flowers may be attached to the top of the body, and thus held in position.

Other and further objects and advantages of the invention will be hereinafter set forth and the novel features thereof defined by the appended claims.

In the drawings, Figure 1 is a perspective showing the invention as applied in use; Fig. 2, a longitudinal section thereof, and Fig. 3 a central cross-section.

Like letters of reference refer to like parts in the several figures of the drawings.

The letter A designates the body of the holder, which may be of any desired material—for instance, birch-bark, when it is desired to impart an ornamental appearance thereto. This body is preferably of cylindrical form and provided with open ends, each of which is provided with a reticulated face B, secured in position in any desired manner—for instance, by means of the flange B', lying within the body, to which it may be secured by stitching or otherwise. The body is also provided with an opening A' at its upper portion, into which a holding-ring C is introduced, and projects above the body, so as to form a loop, through which other cut flowers may be inserted for the purpose of giving an ornamental finish to the upper surface of the body. This loop is of elastic character and is held in position by its compression within the body, by which means the flower-stems are held within the loop. The loop is here shown as composed of coiled wire, but may be otherwise formed. Under some conditions it is also desirable to provide a handle $A^2$, of any desired material, extending from the opposite ends of the holder, by which the same may be hung or carried, as found desirable.

The application of the flowers to the invention is shown in Fig. 1, and the flowers constituting the floral ends to the holder are held in position by inserting the stems thereof or of a collected bunch through the openings in the reticulated surface by which they are held in position, and in the use of the holder other flowers may be inserted within the loop, while the handle is covered with vines or similar growth.

It will thus be seen that the invention provides a flower-holder of ornamental design which can be repeatedly used with flowers of different characters and which, owing to its simplicity of construction, can be economically manufactured and the flowers applied thereto by persons not skilled in the art of floral decoration.

Having described my invention and set forth its merits, what I claim, and desire to secure by Letters Patent, is—

1. A flower-holder comprising a body portion having opposite open ends, and reticulated face portions secured thereto at said ends.

2. A flower-holder comprising a body portion having opposite reticulated ends secured thereto, and a compressible loop within said body projected through an opening in the upper portion thereof.

3. A flower-holder comprising a body portion having opposite reticulated ends secured thereto, a compressible loop within said body projected through an opening in the upper portion thereof, and a handle extending from the opposite ends of said body.

4. In a flower-holder, a cylindrical body portion, reticulated end portions provided with flanges inserted within the ends of the body and secured thereto, and a compressible ring frictionally held within the body and extended through an aperture at the upper portion thereof.

In testimony whereof I affix my signature in presence of two witnesses.

CATHERINE E. H. JACOBY.

Witnesses:
GEO. J. P. YOUNG,
GEO. F. KICHLINE.